United States Patent
Kang et al.

(10) Patent No.: US 10,136,661 B2
(45) Date of Patent: Nov. 27, 2018

(54) PROCESS FOR PREPARING FERMENTED SOYBEAN MEAL

(71) Applicant: CJ CHEILJEDANG CORPORATION, Seoul (KR)

(72) Inventors: Kyung Il Kang, Incheon (KR); Su Jin Heo, Bucheon-si (KR); Seong Jun Cho, Seoul (KR); Taek Beom Kim, Gyeonggi-do (KR); Seung Won Park, Gyeonggi-do (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 0 days.

(21) Appl. No.: 14/708,918

(22) Filed: May 11, 2015

(65) Prior Publication Data

US 2016/0015055 A1    Jan. 21, 2016

(30) Foreign Application Priority Data

May 9, 2014    (KR) ........................ 10-2014-0055625

(51) Int. Cl.
| | |
|---|---|
| A23K 1/00 | (2006.01) |
| A23K 10/12 | (2016.01) |
| A23K 50/10 | (2016.01) |
| A23L 11/00 | (2016.01) |

(52) U.S. Cl.
CPC .............. *A23K 1/007* (2013.01); *A23K 10/12* (2016.05); *A23K 50/10* (2016.05); *A23L 11/00* (2016.08); *A23L 11/09* (2016.08); *Y02P 60/877* (2015.11)

(58) Field of Classification Search
CPC .... A61K 35/747; A23K 1/007; A23K 1/1813; A23K 1/18; A23K 1/20; A23K 1/14; C12R 1/07; C12R 1/125; C12R 1/09; C12R 1/075; C12R 1/25; C12R 1/225; C12R 1/245; C12R 1/10; A23V 2250/5488; A23L 1/2008; A23L 1/105; A23L 1/3014; A23L 1/2118; A23L 1/23; A23L 2/39
See application file for complete search history.

(56) References Cited

U.S. PATENT DOCUMENTS

| | | |
|---|---|---|
| 2008/0044501 A1 | 2/2008 | Lee et al. |
| 2013/0212903 A1 | 8/2013 | Onose |

FOREIGN PATENT DOCUMENTS

| | | |
|---|---|---|
| CN | 2138113 Y | 7/1993 |
| CN | 201104783 | 8/2008 |
| CN | 201331249 Y | 10/2009 |

(Continued)

OTHER PUBLICATIONS

CN 201331249 Y, Zhanqiang Zeng, Oct. 2009, Abstract English Translation, pp. 2.*

(Continued)

*Primary Examiner* — Hong T Yoo
(74) *Attorney, Agent, or Firm* — Brooks Kushman P.C.

(57) ABSTRACT

An improved method for producing fermented soybean meal which performs fermentation process and drying process separately in the production of the fermented soybean meal. The method for preparing fermented soybean meal enables prevention of contamination by various germs while shortening the time required for its preparation compared to the conventional method. Therefore, the method can be widely used to more economically prepare the fermented soybean meal.

13 Claims, 3 Drawing Sheets

(56) References Cited

FOREIGN PATENT DOCUMENTS

| | | | |
|---|---|---|---|
| CN | 102018096 | 4/2011 | |
| CN | 103263066 A | 8/2013 | |
| JP | H05268881 | 10/1993 | |
| KR | 20000054036 | 9/2000 | |
| KR | 20110027535 | 3/2011 | |
| KR | 1020110027535 | 3/2011 | |
| KR | 20110035610 | 4/2011 | |
| KR | 20130054337 | 5/2013 | |
| WO | WO 2011031020 A2 * | 3/2011 | ............. A23K 1/007 |

OTHER PUBLICATIONS

Taiwanese Office Action for Application No. TW 104114749, English Translation attached to original, dated Mar. 21, 2016, All together 8 Pages.

Korean Office Action for Korean Application No. KR 10-2014-0055625, Completed by the Korean Patent Office, dated Dec. 18, 2015, 5 Pages.

Extended European Search Report for European Application No. 15166938.9, Completed by the European Patent Office, dated Jul. 16, 2015, 7 Pages.

Ao et al. WPI / Thomson Feb. 8, 2012, XP 002685310, 3 Pages, "Preparing fermented soybean meal used as protein feed preparation for cow, by mixing bean pulp powder and corn, adding water to mixture, subjecting mixed solution to enzymolyzis and fermentation, and sterilizing and drying product".

* cited by examiner

PROCESS FOR PREPARING FERMENTED SOYBEAN MEAL

CROSS-REFERENCE TO RELATED APPLICATIONS

This application claims priority to and the benefit of Korean Patent Application No. 10-2014-0055625, filed May 9, 2014, the disclosure of which is incorporated herein by reference in its entirety.

TECHNICAL FIELD

The present invention relates to an improved method for producing fermented soybean meal and, more particularly, to an improved method for producing fermented soybean meal, which performs fermentation process and drying process separately in the production of fermented soybean meal.

BACKGROUND

As diseases such as bovine spongiform encephalopathy, which are fatal to humans, have been determined to be due to animal protein ingredients which are added to animal feed, there has been a rapid worldwide movement to replace animal protein with vegetable protein. A typical example of such a vegetable protein can include a soybean meal. Soybean meal refers to shell components defatted from soybeans. Generally, it is known that soybean meal contains 9.5% of water, 49.4% of crude protein, 22.1% of inverted sugar, and 27.2% of water-soluble nitrogen. However, soybean meal shows substantially the same disadvantages as most vegetable proteins. Specifically, soybean meal has a relatively low protein content in comparison to animal protein, the composition of essential amino acids needed for livestock is insufficient to that of animal protein, and the content of some vitamins, minerals and UGF (Unknown Growth Factor) is not excellent. Further, it contains several anti-nutritional factors (ANF) and so digestibility is inhibited when used in the feedstuff. In particular, anti-nutritional factors such as a trypsin inhibitor, exhibit the effects of inhibiting growth by lowering digestibility of young livestock. Therefore, the amount of soybean meal added to the feedstuff for young livestock is currently limited.

Various studies attempting to solve the above-described problems of soybean meal have been carried out. A variety of products have been developed where the problems of soybean meal have been resolved, for example, a concentrated soybean protein, a purified soybean protein, a fermented soybean meal and the like. However, the concentrated soybean protein and the purified soybean protein are difficult to use for the feedstuff due to their high production costs. As such, the fermented soybean meal is used as the feedstuff. The fermented soybean meal is produced by the fermentation of soybean meal. Soybean meal has advantages in that an animal protein is added in the fermentation process, the content of the above-mentioned anti-nutritional factor is significantly reduced and further proteins or carbohydrates are enzyme-decomposable, thus making a form which is easily digestible by enzymes. Accordingly, soybean meal is widely used as the feed material and the feed additive.

However, in order to produce the fermented soybean meal, a fermentation apparatus for soybean meal must be provided, and excessive fermentation and drying time are necessary, thereby increasing production costs for the fermented soybean meal. Particularly, compared to conventional methods which dry and grind soybean meal and then use it as the feed material or the feed additive, excessive time is spent drying the fermented soybean meal as water is added to soybean meal to maintain a moisture content of from 30 to 80% for fermentation, and additional time is spent fermenting the soybean meal. To overcome this drawback, various studies have been carried out. As a result, techniques capable of producing a fermenting microorganism showing specific effects in fermenting soybean meal and shortening the fermentation time of soybean meal have been developed. For example, Korean Patent Application Publication No. 2011-0027535 discloses a technique to shorten the fermentation time of soybean meal with the *Bacillus subtilis* TP6 strain.

As such, techniques capable of shortening the fermentation time in the production of the fermented soybean meal have been developed, but techniques to shorten the drying time of fermented soybean meal have not yet been developed.

Using production processes of the fermented soybean meal developed until now, the fermented soybean meal is dried by introducing outside air into the fermentation apparatus immediately after fermentation. The fermentation apparatus contains excessive moisture content in addition to the moisture of the fermented soybean meal and so it takes a long time to remove the moisture. Strategies to shorten the time required for drying the fermented soybean meal by transferring the fermented soybean meal from the fermentation apparatus to a separate drying apparatus and then drying it have been conducted. However, since soybean meal immediately after completion of fermentation contains excessive moisture content, it proved problematic as the soybean meal stuck to the conveyer or transfer channel, blocking the pathway for transfer.

Given these circumstances, the present inventors have conducted numerous and intensive research to develop methods capable of shortening the drying time of the fermented soybean meal during the production of fermented soybean meal. As a result, the inventors have discovered that, when the fermented soybean meal is eddycurrent-transferred while maintaining the moisture content in the fermented soybean meal to 28% or less, the fermented soybean meal can be easily transferred to the drying apparatus and dried in the drying apparatus, thereby shortening the drying time. The present invention has been completed on the basis of this discovery.

The foregoing discussion in this section is to provide general background information, and does not constitute an admission of prior art.

SUMMARY

One object of the present invention is to provide a method for producing fermented soybean meal which includes a step of fermenting a soybean meal, a step of eddycurrent-transferring the fermented soybean meal to the drying apparatus and a step of drying the fermented soybean meal in the drying apparatus.

The present inventors have carried out various researches to develop a method that can shorten the drying time of soybean meal in the production of fermented soybean meal and conceived the method of separating the fermentation step and the drying step. Since the fermentation apparatus which performs the fermentation step maintains the internal moisture content at a very high level, it inevitably takes a long time to dry the soybean meal in the fermentation apparatus. Therefore, the inventors attempted to shorten the drying time by transferring the fermented soybean meal to a separate drying apparatus and drying the same therein. However, since soybean meal contains excessive moisture content immediately after completion of the fermentation, it sticks to a contacting surface of the transfer apparatus such as a transfer pipe and so the transfer is not smoothly made. As such, various studies to resolve these disadvantages have been performed. As a result, the inventors confirmed that, in the case of using the method of eddycurrent-transferring with pre-drying the fermented soybean meal under the conditions, which allows no further fermentation, maintaining the temperature at 25 to 30° C. and the moisture content at 32%(w/w) or less, the fermented soybean meal can be smoothly transferred to the drying apparatus.

Furthermore, the eddycurent-transfer method can prevent the fermented soybean meal having high moisture content from sticking to the contacting surface of the transfer apparatus. However, in the case where the fermented soybean meal contains excessive moisture content, it is not possible to prevent it from sticking to the contacting surface of the transfer apparatus. Therefore, as the result of determining the critical level of the moisture content of the fermented soybean at which the eddycurrent-transfer method can be applied through the pre-drying step, it was confirmed that, when moisture content of the fermented soybean meal is maintained at 32% or less, the fermented soybean can be prevented from sticking to the contacting surface of the transfer apparatus.

Accordingly, when the eddycurrent-transfer method is used while maintaining the moisture content of the fermented soybean meal at 32% or less through the pre-drying step, the fermented soybean meal can be transferred to the drying apparatus and also the fermented soybean meal can be dried in the drying apparatus. Consequently, the drying time of the fermented soybean meal was shortened to thereby increase the productivity of production of the fermented soybean meal.

DETAILED DESCRIPTION

In one embodiment for achieving the above-described object, the present invention provides a method for preparing fermented soybean meal which includes (a) a step of fermenting a soybean meal; (b) a step of eddycurrent-transferring the fermented soybean meal to a drying apparatus; and (c) a step of drying the fermented soybean meal in the drying apparatus.

The phrase "step of fermenting a soybean meal" as used herein refers to a process consisting of (a1) a step of adding water to a soybean meal and heat-treating it; (a2) a step of inoculating the heat-treated soybean meal with a fermenting microorganism; and (a3) a step of fermenting the fermenting microorganism-inoculated soybean meal to obtain the fermented soybean meal.

First, the heat treatment step included in the above-described process removes various germs contained in the soybean meal and also denatures proteins contained in the soybean meal, thereby capable of promoting the growth of the fermenting microorganism to be inoculated subsequently. If the step of adding the water is omitted prior to the heat treatment, there may occur a problem that too much of the existing water in the soybean meal is removed during the heat treatment. Therefore, although the fermenting microorganism is inoculated, the fermentation is not performed and a part of soybean meal is carbonized. The amount of water to be added is not particularly limited as long as it can exhibit the above-described effect. However, specifically, water may be added so that the moisture content of the soybean meal is in the range of from 30 to 80%. More specifically, water may be added so that the moisture content of the soybean meal is in the range of from 30 to 70%. Most specifically, water may be added so that the moisture content of the soybean meal is in the range of from 40 to 60%.

In addition, the heat treatment step may, as long as it can exhibit the above-described effect, be performed using steam or superheated steam so that the moisture contained in the soybean meal is not lost. The temperature and time for the heat treatment step are not particularly limited, but it may be treated with steam of from 70 to 130° C. or superheated steam of from 200 to 300° C. for several seconds to several hours. More specifically, it may be treated with steam of from 70 to 130° C. for from 10 to 30 minutes. Most specifically, it may be treated with steam of from 80 to 121.1° C. for from 10 to 30 minutes.

In performing the heat treatment, when the heat treatment temperature is low or the treatment time is short, there will be a problem that the sterilization of various germs may not be effectively performed or the subsequent fermentation process may not proceed smoothly. When the heat treatment is performed at high temperature or for too long, there may occur a problem that the digestibility is reduced due to the denaturation of the proteins in soybean meal, thereby lowering the quality of the final product.

Next, the step of inoculating the fermenting microorganism included in the above-described process is performed by inoculating the heat-treated soybean meal with a suitable fermenting microorganism wherein the fermenting microorganism are not particularly limited, for example, lactic acid bacteria or *Bacillus* bacteria can be used alone or in combination. More specifically, *Lactobacillus sakei, Lactobacillus brevis, Lactobacillus plantarum, Bacillus subtilis, Bacillus cereus, Bacillus megaterium* or *Bacillus clausii* may be used alone or in combination.

Furthermore, prior to inoculating the fermenting microorganism, the step of cooling the heat-treated soybean meal to a suitable temperature for proliferation of the fermenting microorganism can be further included. The cooling temperature is not particularly limited, for example, 30° C. to 50° C., more specifically 35° C. to 45° C. and most specifically 37° C. Furthermore, the cooling method is not particularly limited, but it can be performed using a cooling apparatus such as a conveyor type cooling apparatus.

Further, the inoculum dose of the fermenting microorganism is not particularly limited, but the stains can be inoculated so that the number of cells contained in the soybean immediately after inoculation is 105 to 109 CFU/g. When inoculation is made in a smaller amount than the above range, it takes a long time to ferment soybean meal and the incubation time for the production is long. Additionally, it is highly likely to be contaminated with various germs. When inoculation is made in a larger amount than the above range, the fermentation time can be considerably reduced, but there is a disadvantage that it is a burden in the production of the seed for inoculation.

Finally, the fermenting step included in the above-described process can be performed by culturing in an incubator, without applying a separate medium to soybean meal inoculated with the above-described fermenting microorganism. The incubator which can be used herein is not particularly limited, for example, a packed bed fermentor can be used. More specifically, a batch type aeration fermentor, a close type fermentor, a continuous aeration fermentor and the like can be used.

Moreover, the fermentation conditions are not particularly limited, for example, the fermentation may be performed at 20 to 50° C. for 12 to 72 hours, more specifically at 30 to 45° C. for 12 to 48 hours, and most specifically at 37° C. for 24 hours.

The phrase "step of eddycurrent-transferring the fermented soybean meal to a drying apparatus" as used herein refers to a step of transferring the fermented soybean meal to a drying apparatus using a eddycurrent-transfer apparatus. The term "eddycurrent-transfer apparatus" as used herein refers to an apparatus capable of inducing the pressure difference using the electric motor and the vacuum pump to thereby perform the eddycurrent-transfer which is a method for transferring the material of interest.

Figure 1:
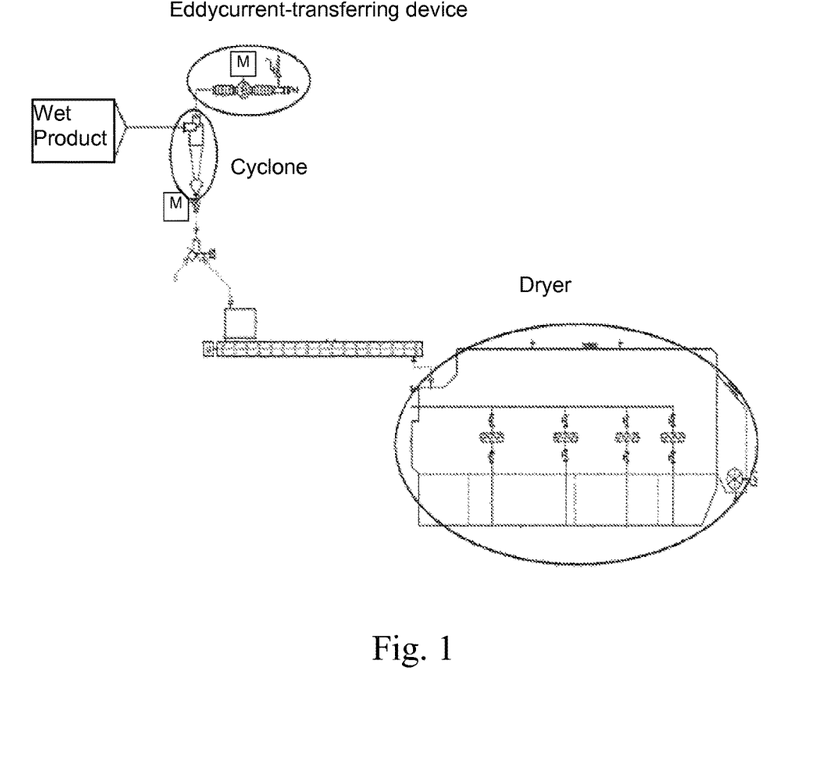
FIG. 1 is a schematic diagram showing one embodiment of the eddycurrent-transfer apparatus according to the present invention.

In the present invention, the eddycurrent-transfer apparatus comprises an electric motor, a roots blower and a transfer pipe, wherein one side end of the transfer pipe is connected to the fermentation apparatus and another end is configured to be connected to a cyclone which is an intermediate storage apparatus connected to the drying apparatus (see FIG. 1). FIG. 1 is a schematic diagram showing one example of a eddycurrent-transfer apparatus of the present invention. When the roots blower is operated, a negative pressure is formed in the cyclone and the fermented soybean meal present in the fermentation apparatus is introduced into the cyclone via a transfer pipe. The transferred fermented soybean meal can be dried by delivering to the drying apparatus.

Further, for the smooth transfer, the moisture content of the fermented soybean meal can be adjusted through the pre-drying procedure. Specifically, the moisture content can be adjusted to 25 to 32 percent. More specifically, the moisture content can be adjusted to 25 to 28 percent. At this time, means for adjusting the moisture content is not particularly limited, for example, but it may be performed by an air-conditioning fan (turbo blower). For example, the air inlet damper provided with the fermentation facility is opened and the air-conditioning fan connected to the damper is operated. Thus, the heat air which underwent the heat exchanger is introduced into the inner part of the fermentation facility forming a pre-drying apparatus via the damper to thereby discharge the moisture in the fermentation material to the outer part and adjusting the moisture content.

The phrase "step of drying the fermented soybean meal in the drying apparatus" as used herein refers to a step of applying the fermented soybean meal to the drying apparatus and drying the fermented soybean meal. At this time, the moisture content contained in the final dried fermented soybean meal may be, but is not particularly limited to, for example, from 3.9 to 10%, more specifically from 3.9 to 9.7%, and most specifically 8.4%.

The drying conditions are not particularly limited, but the drying may be performed at from 75 to 90° C. for from 10 to 35 minutes. Further, the drying may be performed using a multi-chamber type continuous drying apparatus. Specifically, the inside is partitioned into three zones (zone #1, #2 and #3), each zone being provided with a heater pipe which is a auxiliary heat source. The drying may be performed by the multi-chamber type continuous drying apparatus which can precisely control the temperature of each zone. For example, in the case of using the multi-chamber type continuous drying apparatus, the fermented soybean meal may be dried while maintaining the temperature of zone #1 as from 68 to 76° C.

Figure 2:
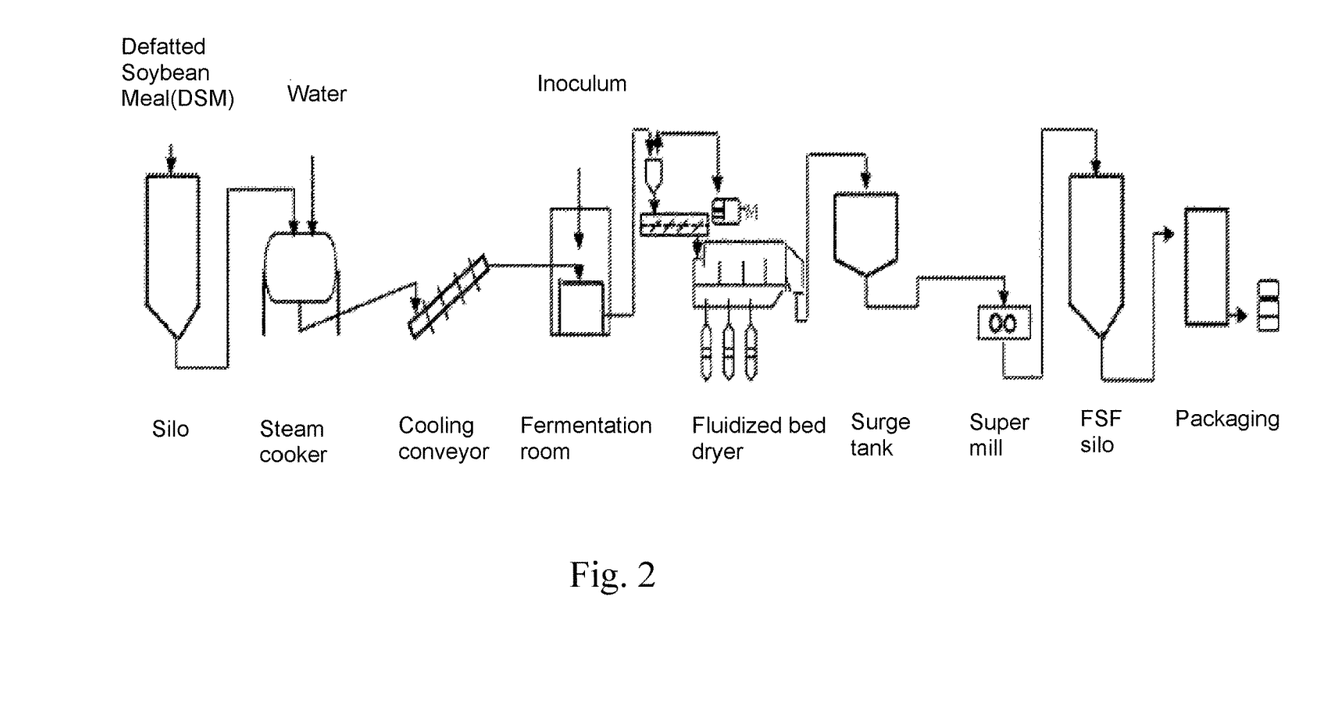
FIG. 2 is a schematic diagram showing the configuration of a process that can be applied to the method for preparing fermented soybean according to the present invention.
Figure 3:
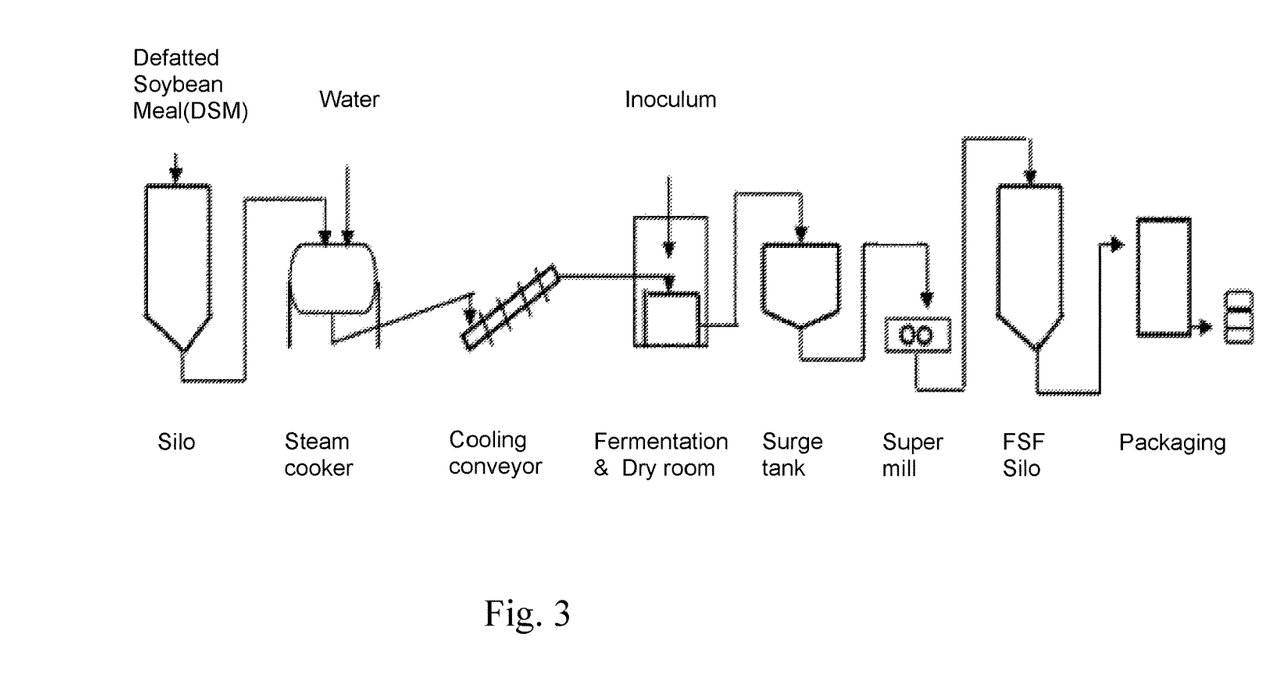
FIG. 3 is a schematic diagram showing the configuration of a conventional process for preparing fermented soybean meal.

The method for preparing the fermented soybean meal provided by the present invention may be applied to the process for producing a fermented soybean meal by using the continuous apparatus. For example, the process for producing the fermented soybean meal as shown in FIG. 2 may be used. Specifically, when soybean meal is filled in the silo, soybean meal is transferred to the steam cooker, hydrolyzed and heat-treated. The heat-treated soybean meal is moved in the fermentation room using a cooling conveyer. In the fermentation room, fermentation is proceeded by inoculating the soybean meal with the fermenting microorganism. Upon completion of the fermentation process, the fermented soybean meal is pre-dried, transferred to a fluidized bed dryer by a eddycurrent-transfer apparatus, and dried. The dried fermented soybean meal is transferred to a surge tank and then transferred to FSF Silo via a super mill. Thereafter, it is packed and commercialized.

The production of fermented soybean meal by the continuous process enables to shorten the drying time of the fermented soybean meal due to the eddycurrent-transfer apparatus and the drying apparatus connected thereto, compared to when a conventional process was employed.

Using the method for preparing fermented soybean meal according to the present invention, the time required for the preparation process can be shortened while preventing contamination by various germs, as compared to the conventional method. Therefore, the method of the present invention can be widely utilized to more economically prepare the fermented soybean meal.

EXAMPLES OF THE INVENTION

Hereinafter, the present invention will be described in detail with reference to the following examples. However, these examples are intended only to describe for the purpose of illustrating the invention, but not to limit the range of the present invention to these examples.

Example 1

Solid-State Fermentation of Soybean Meal 100 g of soybean meal was added with water to adjust the moisture content of the soybean meal in a range of from 45 to 46%, and then heat-treated at a temperature of from 90 to 95° C. for from 20 to 30 minutes. The heat-treated soybean meal was cooled and inoculated with 5 to 20 ml of *Bacillus subtilis* TP6 (KFCC 11343P) culture, and then solid-state fermented at 37° C. for 24 hours.

Example 2

Determination of the Eddycurrent-Transfer Condition of Fermented Soybean Meal

The eddycurrent-transfer condition was established using the solid-state fermented soybean meal prepared in Example 1.

Specifically, the solid-state fermented soybean meal from Example 1 was treated with hot air of from 70 to 80° C. for from 60 to 90 minutes, to thereby perform a forced air flowing. Next, with or without stirring, the temperature was adjusted to 25 to 30° C., and the moisture content to 28, 32, 35 and 40%, respectively, to obtain the fermented soybean meal. Subsequently, while eddycurrent-transferring the respective fermented soybean meal with an adjusted moisture content through a transfer pipe, the transfer capacity, the transfer pipe closure possibility, and the eddycurrent-transfer possibility were compared (Table 1). At this time, the relative humidity of the interior of the fermentation apparatus performing the fermentation was adjusted to a range from 50 to 60%.

TABLE 1

Transfer capacity and potential of the eddycurrent-transfer according to the moisture content of the fermented soybean meal

| Moisture content (%) | Stirring or not | Transfer capacity (ton/hour) | Transfer pipe closure | Eddycurrent-transfer possibility |
| --- | --- | --- | --- | --- |
| 28 | ◦ | 5.0 | No closure | Possible |
| 32 | ◦ | 4.3 | Local closure | Possible |
| 35 | x | 3.0 | Curved surface closure | Impossible |
| 40 | x | 2.0 | Whole closure | Impossible |

As shown in Table 1, it was confirmed that, when the water content contained in the fermented soybean meal is 32% or less and the transfer capacity is greater than 4 tons per hour, it could be applied to the eddycurrent-transfer method.

Example 3

Determination of the Drying Conditions of the Fermented Soybean Meal

Using the continuous pilot drying apparatus, the conditions for concurrently performing sterilization and drying were determinated. Specifically, the solid-state fermented soybean meal from Example 1 was artificially inoculated with 1.0 to 109 to 2.0 to 109 cfu/g of indicator organisms and stirred with hot air of 70° C. treatment to adjust the moisture content in the fermented soybean meal to 32%. The adjusted fermented soybean meal was put in the continuous pilot drying apparatus, maintained at an input amount of 2.0 kg/h, dried, with movement, at a temperature of from 70 to 90° C. for from 0 to 60 minutes and cooled. Then, the moisture content, the protein denaturation level (KOH (%)) and the indicator organism sterilization level (Log) contained in the dried fermented soybean meal were measured and compared (Table 2).

TABLE 2

Quality Comparison of the dried fermented soybean meal according to the drying conditions of the fermented soybean meal

| Test group | Temperature (° C.) | Time (Min) | Moisture content (%) | KOH (%) | Sterilization of indicator organism (Log) |
| --- | --- | --- | --- | --- | --- |
| 1 | 70 | 0 | 33.3 | 66.8 | 0.0 |
| 2 | 70 | 30 | 9.1 | 71.8 | OM |
| 3 | 70 | 40 | 5.6 | 73.6 | 3.3 |
| 4 | 70 | 50 | 4.7 | 69.7 | 2.5 |
| 5 | 70 | 60 | 4.1 | 68.9 | 4.9 |
| 6 | 75 | 25 | 9.6 | 69.2 | 2.2 |
| 7 | 75 | 35 | 8.4 | 70.9 | 6.9 |
| 8 | 75 | 55 | 3.9 | 69.5 | 14.7 |
| 9 | 80 | 10 | 14.1 | 75.1 | 2.8 |
| 10 | 80 | 20 | 9.7 | 76.4 | 9.0 |
| 11 | 90 | 10 | 13.7 | 75.3 | 2.6 |
| 12 | 90 | 15 | 10.6 | 76.7 | 6.8 |

As shown in Table 2, it was confirmed that, even when drying at a temperature of 70° C., an appropriate moisture content (10% or less) could be satisfied, but the drying time required and the sterilization level of indicator organism were below the goal. That is, it could be seen that, when drying at a temperature of 70° C., an appropriate level of sterilization of the indicator organism was not exhibited until drying for at least 40 minutes or more and so excessive drying time is required.

However, it was confirmed that, when the fermenting material temperature is 75° C. to 90° C. and more specifically, 75° C. to 80° C., the moisture content, the protein denaturation level and the indicator organism sterilization level contained in the fermented soybean meal were appropriate.

Therefore, it could be seen that the drying of fermented soybean meal is preferable when performed at a temperature of from 75° C. to 90° C. for from 10 to 35 minutes.

Example 4

Evaluation of Drying Process Using Continuous Drying Apparatus

The solid-state fermented soybean meal from Example 1 was artificially inoculated with 1.0 to 109 to 2.0 to 109 cfu/g of indicator organism and stirred under hot air treatment at 70° C. to thereby obtain fermented soybean meal having a moisture content of from 28.2 to 35.4%. The fermented soybean meal was dried using a continuous dryer designed so that the inside thereof was partitioned into three zones (zone #1, zone #2 and zone #3), and the fermenting material temperature of the dried soybean meal in every zone was precisely controlled with a multi-chamber type which includes heater piper per zone as a auxiliary heat source. At this time, the retention time for all zones was 10 minutes. The moisture content contained in the fermented soybean meal, the denaturation level (KOH (%)) of protein and the sterilization level(Log) of indicator organism were measured and compared (Table 3).

TABLE 3

Quality comparison of the fermented soybean meal dried using the continuous drying apparatus

| Test group | Input (ton/hour) | Moisture content (%) | | Fermenting material temperature per zone (° C.) | | | KOH (%) | Sterilization level (Log) |
| --- | --- | --- | --- | --- | --- | --- | --- | --- |
| | | inflow | Outflow | #1 | #2 | #3 | | |
| 21 | 4.6 | 30.3 | 9.4 | 55 | 71 | 75 | 74 | 0.2 |
| 22 | 4.6 | 30.3 | 9.1 | 60 | 72 | 75 | 74 | 0.4 |

TABLE 3-continued

Quality comparison of the fermented soybean meal dried using the continuous drying apparatus

| Test group | Input (ton/hour) | Moisture content (%) | | Fermenting material temperature per zone (° C.) | | | KOH (%) | Sterilization level (Log) |
|---|---|---|---|---|---|---|---|---|
| | | inflow | Outflow | #1 | #2 | #3 | | |
| 23 | 5.0 | 28.2 | 8.2 | 68 | 72 | 78 | 72 | 1.0 |
| 24 | 4.6 | 30.3 | 8.0 | 70 | 73 | 79 | 72 | 1.2 |
| 25 | 4.3 | 32.5 | 7.3 | 72 | 76 | 78 | 70 | 1.2 |
| 26 | 3.5 | 35.4 | 6.2 | 76 | 78 | 82 | 69 | 1.4 |

As shown in Table 3, the fermenting material temperature of zone #1 among the internal fermenting material temperatures of the continuous drying apparatus was very important in satisfying the condition to obtain the required moisture content, the denaturation level (KOH (%)) of protein, and the sterilization level(Log) of indicator organism in the fermented soybean meal.

That is, as shown in Test Groups 21 and 22, when the fermenting material temperature of zone #1 was in the range of from 55 to 60° C., the moisture content and the protein denaturation level exhibited a satisfactory level, whereas the sterilization level of indicator organism exhibited 1.0 or less and so the sterilization was not sufficient.

Accordingly, in order to obtain the required moisture content, the protein denaturation level (KOH (%)) and the indicator organism sterilization level(Log) of the fermented soybean meal prepared by the method of the present invention, it was confirmed that the fermenting material temperature of zone #1 should be preferably maintained at from 68 to 76° C.

Example 5

Productivity of the Fermented Soybean Meal According to the Introduction of the Continuous Drying Apparatus Due to the separation of the solid-state fermentation and the drying process for the fermented soybean meal according to the introduction of the continuous drying apparatus as used in Example 4, the innovative lead time shortening of the fermentation and drying processes, the productivity improvement thereof, and cost reduction were compared.

TABLE 4

Effect of productivity improvement in the preparation of fermented soybean meal according to the use of continuous drying apparatus

| Class | | Unit | Operation result | | Remark |
|---|---|---|---|---|---|
| | | | Existing | Improve | |
| Productivity | Process time | Time | 48 | 36 | 32% increase in annually production |
| Utility | Steam basic unit | Relative (%) | 100 | 87 | Steam 13% reduction |
| | Electric basic unit | | 100 | 92 | Electric 8% reduction |
| | Water basic unit | | 100 | 71 | Water 29% reduction |
| Quality | KOH | % | −5 | 3 | KOH 8% increase |

As shown in Table 4, when the solid-state fermentation and drying processes for the fermented soybean meal were separated by adjusting the fermented material with the moisture content available for eddycurrent-transfer after solid-state fermentation, effects such as a 32% increase in productivity, utility savings, and a low protein denaturation rate were achieved and thus a high quality of fermented soybean meal could be prepared economically.

This may solve the problems which cause a reduction in the fermentation equipment operation rate and an increase in production costs associated with conventional process for producing fermented soybean meal and which make the product quality non-uniform due to the partial air conditioning imbalance in view of the characteristics of the fermentation apparatus. It also has the advantage of enabling to prevent equipment damage and aging due to overload during drying using a fermentation apparatus, thereby reducing maintenance costs and extending the service life.

What is claimed is:

1. A method for preparing fermented soybean meal, comprising:
   (a3) fermenting soybean meal in a fermentation apparatus while adding water to the fermenting the soybean meal to maintain moisture content in the range of 40-60%;
   (a4) pre-drying the fermented soybean meal to achieve a moisture content to 25 to 32%; in a pre-drying apparatus;
   (b) eddycurrent-transferring the pre-dried fermented soybean meal to a drying apparatus from the pre-drying apparatus using an eddycurrent-transferring apparatus; and
   (c) drying the fermented soybean meal in the drying apparatus at a temperature of from 75 to 90° C. for from 10 to 35 minutes.

2. The method of claim 1, wherein step (a) comprises (a1) adding water to the soybean meal followed by heat-treatment; (a2) inoculating the heat-treated soybean meal with a fermenting microorganism; and (a3) fermenting the soybean meal inoculated with the fermenting microorganism on a solid medium to obtain the fermented soybean meal.

3. The method of claim 2, wherein during the during pre-drying step (a4) the soybean meal temperature is adjusted to 25-30° C.

4. The method of claim 2, wherein step (a1) is performed by treating with steam at from 70 to 130° C. or superheated steam at from 200 to 300° C.

5. The method of claim 2, which further comprises cooling the soybean meal to from 30 to 50° C. between step (a1) and step (a2).

6. The method of claim 2, wherein step (a2) is performed by inoculating the soybean meal with the fermenting microorganism selected from the group consisting of Lactobacillus sakei, Lactobacillus brevis, Lactobacillus plantarum, Bacillus subtilis, Bacillus cereus, Bacillus megaterium, Bacillus clausii and a combination thereof.

7. The method of claim 2, wherein step (a2) is performed by inoculating the soybean meal with the fermenting microorganism so that the number of cells of the microorganism contained in the soybean meal becomes $10^5$ to $10^9$ CFU/g.

8. The method of claim 2 wherein step (a3) is performed by fermenting the soybean meal at a temperature of from 20 to 50° C. for from 12 to 72 hours.

9. The method of claim 1, wherein the moisture content of the fermented soybean meal is adjusted by applying a hot air of from 70 to 80° C. for from 60 to 90 minutes.

10. The method of claim 1, wherein the step (c) is performed by a multi-chamber type continuous drying apparatus.

11. The method of claim 1, wherein a final moisture content of the fermented soybean meal is from 3.9 to 10%.

12. The method of claim 10, wherein the multi-chamber type continuous drying apparatus is a drying apparatus partitioned into three zones (zone #1, #2 and #3), includes a heater pipe per each zone as an auxiliary heat source, and controlling the temperature of each zone.

13. The method of claim 12, wherein, when the multi-chamber type continuous drying apparatus is used, the drying is performed by maintaining the fermenting material temperature of zone #1 at from 68 to 76° C.

* * * * *

UNITED STATES PATENT AND TRADEMARK OFFICE
CERTIFICATE OF CORRECTION

| | |
|---|---|
| PATENT NO. | : 10,136,661 B2 |
| APPLICATION NO. | : 14/708918 |
| DATED | : November 27, 2018 |
| INVENTOR(S) | : Kyung Il Kang et al. |

It is certified that error appears in the above-identified patent and that said Letters Patent is hereby corrected as shown below:

In the Claims

Column 10, Line 53, Claim 3:
After "method of claim 2, during"
Delete "the during".

Column 11, Line 9, Claim 9:
After "is adjusted by applying"
Delete "a".

Signed and Sealed this
Sixteenth Day of April, 2019

Andrei Iancu
*Director of the United States Patent and Trademark Office*